(12) United States Patent
Motohashi et al.

(10) Patent No.: US 11,146,736 B2
(45) Date of Patent: Oct. 12, 2021

(54) VIDEO IMAGING DEVICE

(71) Applicant: SMK Corporation, Tokyo (JP)

(72) Inventors: Kazutaka Motohashi, Tokyo (JP); Motohiro Kawasaki, Tokyo (JP)

(73) Assignee: SMK Corporation, Tokyo (JP)

( * ) Notice: Subject to any disclaimer, the term of this patent is extended or adjusted under 35 U.S.C. 154(b) by 78 days.

(21) Appl. No.: 16/666,871

(22) Filed: Oct. 29, 2019

(65) Prior Publication Data

US 2020/0314317 A1      Oct. 1, 2020

(30) Foreign Application Priority Data

Mar. 29, 2019 (JP) ................................ JP2019-65758

(51) Int. Cl.
| | |
|---|---|
| *H04N 5/235* | (2006.01) |
| *H04N 5/225* | (2006.01) |
| *H04N 5/232* | (2006.01) |

(52) U.S. Cl.
CPC ......... *H04N 5/2352* (2013.01); *H04N 5/2256* (2013.01); *H04N 5/2353* (2013.01); *H04N 5/23203* (2013.01); *H04N 5/23241* (2013.01)

(58) Field of Classification Search
CPC ............. H04N 5/2352; H04N 5/23241; H04N 5/2353; H04N 5/2256; H04N 5/23203; H04N 5/23212; H04N 5/44504
See application file for complete search history.

(56) References Cited

FOREIGN PATENT DOCUMENTS

| EP | 0661883 A2 | * | 7/1995 | ......... H04N 21/4223 |
|---|---|---|---|---|
| JP | 2015-154387 A | | 8/2015 | |
| JP | 2015154387 A | * | 8/2015 | |
| JP | 2017-147578 A | | 8/2017 | |

OTHER PUBLICATIONS

Machine English Translation, JP 2015154387 A, Aug. 24, 2015 (Year: 2015).*

* cited by examiner

*Primary Examiner* — Nelson D. Hernández Hernández
(74) *Attorney, Agent, or Firm* — Locke Lord LLP

(57) ABSTRACT

Provided is a video imaging device in which, even if a camera module and an imaging device main body are connected only by one coaxial cable, a communication error does not occur between the camera module and the imaging device main body through the coaxial cable. A first superimposition circuit of the camera module superimposes imaging signals sequentially outputted from an imaging unit and imaging operation timing information thereof on a DC power voltage applied to the coaxial cable in a voltage stable period after a lapse of a voltage variation period that is set at a predetermined elapsed time from a time of the turn-on or -off control of the light source. Thus, imaging signals and imaging operation timing information thereof can be outputted to imaging device main body without being affected by variations in DC power voltage due to the turn-on or -off control of the light source.

18 Claims, 6 Drawing Sheets

VIDEO IMAGING DEVICE

FIELD

The present invention relates to a video imaging device for imaging a video of an imaging field illuminated by a light source, and more specifically relates to a video imaging device in which a camera module for capturing a video and an imaging device main body for outputting the captured video are connected by one coaxial cable.

BACKGROUND

A camera module for capturing a video and an imaging device main body for outputting the captured video are required to be connected using a power cable and a lot of signal cables, in order to bidirectionally transmit and receive imaging signals and control signals between the camera module and the imaging device main body, and furthermore to supply power from the imaging device main body to each component of the camera module. Since the connection causes complicated wiring and poor flexibility, a video imaging device in which a camera module and an imaging device main body are connected collectively by a power cable and an LVDS (low voltage differential signaling) cable, which functions as a signal cable, is known (Patent Literature 1).

A conventional video imaging device 100 will be described with reference to FIG. 5. In a camera module 101, an imaging unit 102, an imaging controller 103, a memory 104, a serial-to-parallel and parallel-to-serial converter 105, and an LED driver 107 for controlling the turn-on and -off of an LED 106 are connected by an internal bus. In an imaging device main body 110, which is connected to the camera module 101 by an LVDS cable 120, i.e., a connection cable, a serial-to-parallel and parallel-to-serial converter 111, an ISP (image signal processor) 112, and a video output unit 113 are connected by an internal bus.

The imaging unit 102 of the camera module 101 captures images of an imaging field at predetermined intervals, and sequentially outputs imaging signals representing individual frame images together with imaging timing information thereof, as a stream, to the serial-to-parallel and parallel-to-serial converter 105, which functions as a serializer. The imaging controller 103 controls imaging operation, including AF control, AE control, or AWB control of the imaging unit 102 on the basis of imaging control signals outputted from the ISP 112 of the imaging device main body 110. Furthermore, the imaging controller 103 generates a light source control signal for controlling the turn-on and -off of the LED 106 on the basis of imaging timing information outputted from the imaging unit 102 and outputs the light source control signal to the LED driver 107, so as to control an exposure period of an imaging element 102a of the imaging unit 102, in other words, to control the turn-on and -off of the LED 106 in synchronization with the intervals of capturing the images of the imaging field. The LED 106 is provided in the camera module 101, while facing the imaging field, to illuminate the imaging field whose images are captured by the imaging unit 102, so that the images of the imaging field illuminated by the LED 106 are captured.

The ISP 112 of the imaging device main body 110 generates a video image by sequentially joining the image signals, which represent the frame images, and outputs the video image from the video output unit 113 to an external monitor or the like. The ISP 112 generates the imaging control signal from each of the inputted frame images to correct the frame image, and outputs the imaging control signal to the imaging controller 103 through the LVDS cable 120. The imaging controller 103 controls the imaging operation of the imaging unit 102 in accordance with the imaging control signal, so that the correction of the frame image is fed back to a frame image that is newly captured by the imaging unit 102.

DC power for driving each component of the camera module 101, except for the LED 106 and the LED driver 107, is supplied from the imaging device main body 110 through the LVDS cable 120 connected to the camera module 101. Since the LVDS cable 120 also functions as a bidirectional serial transmission line, in addition to the imaging signal and the imaging timing information, an ACK signal, which responds to the imaging control signal, is superimposed on the DC power voltage and outputted from the serial-to-parallel and parallel-to-serial converter 105 of the camera module 101 to the imaging device main body 110, and the imaging control signal generated by the ISP 112 is superimposed on the DC power voltage of the LVDS cable 120 and outputted from the serial-to-parallel and parallel-to-serial converter 111 of the imaging device main body 110 to the imaging controller 103 of the camera module 101.

A DC power current for driving the components of the camera module 101, except for the LED 106 and the LED driver 107, is of the order of 300 mA. Since the power consumption of the components is approximately constant and stable, the DC power voltage of the LVDS cable 120 does not largely vary. The signals, including the imaging signals and the like, superimposed on the DC power voltage do not vary or disappear, thus causing no transmission and reception error.

On the other hand, a power line of the LED 106 and the LED driver 107, through which a large drive current of the order of 1 A flows and on which a largely varying DC voltage is applied due to the turn-on and -off of the LED 106, is connected to an LED power supply 114 of the imaging device main body 110 using a dedicated power cable 121.

Against the conventional video imaging device 100, there is known a video imaging device in which a camera module and a imaging device main body are connected by only one coaxial cable, and DC power is supplied from the imaging device main body to the camera module by the coaxial cable to drive all circuit elements of the camera module, including a light source (LED) and an LED driver (Patent Literature 2).

CITATION LIST

Patent Literature

Patent Literature 1: Japanese Patent Application Laid-Open No. 2017-147578

Patent Literature 2: Japanese Patent Application Laid-Open No. 2015-154387

SUMMARY

Technical Problem

The conventional video imaging device 100, in which the camera module 101 and the imaging device main body 110 are connected by the two cables i.e. the expensive LVDS cable 120 and the power cable 121, has increased cost, complicated wiring, and impaired appearance. In general, the camera module for capturing a video is often installed in a place several or more meters away from the imaging device main body that is installed near a monitor for reproduction of a video. The longer the distance, the more conspicuous the problem.

As described in Patent Literature 2, the problem can be solved by connecting the camera module 101 and the imaging device main body 110 by one coaxial cable without wiring the separate power cable 121, but the following new problem occurs. The problem will be described below with reference to FIG. 6.

FIG. 6 is a timing chart showing the state of each component when the camera module 101 and the imaging device main body 110 of the video imaging device 100 are connected by one coaxial cable. As shown in the chart, the imaging element 102a captures an image of an imaging field in an exposure operation period between t0 and t1 at intervals of 1/60 seconds to generate an imaging signal of one frame image, and outputs the imaging signal representing the captured one frame image in timing indicated by Vsync after the time t1 of end of an exposure operation period. The imaging signal is outputted to the ISP 112 of the imaging device main body 110 through the coaxial cable to which the DC power voltage is applied to supply power from the imaging device main body 110 to the camera module 101. More specifically, a modulation signal that has been pulse-modulated with the imaging signal is superimposed on the DC power voltage applied to the coaxial cable, and outputted to the imaging device main body 110.

To illuminate the imaging field during imaging by the imaging unit 102, the turn-on and -off of the LED 106 is controlled in synchronization with the exposure operation period (t0 to t1) of the imaging element 102a. The LED 106 is turned on by the supply of the DC power from the imaging device main body 110 through the coaxial cable for connecting between the camera module 101 and the imaging device main body 110. Since the drive current for turning on the LED 106 is large on the order of 1 A, the DC power voltage applied to the coaxial cable instantaneously drops at the time t0 of the turn-on of the LED 106, and gradually increases to and becomes stable at the original application voltage. At the time t1 of the turn-off of the LED 106, on the other hand, the DC power voltage instantaneously rises, and gradually decreases to the original application voltage in a period of the order of 3 msec after t1, and becomes stable at that voltage.

As described above, since the modulation signal that has been pulse-modulated with the imaging signal is superimposed on the DC power voltage in a voltage variation period in which the DC power voltage varies after the time t1 of the turn-off of the LED 106, the pulse waveform collapses, and the rising edge or falling edge of the rectangular wave varies in accordance with variations in the DC power voltage. Therefore, there is a problem that the pulse-modulated imaging signal cannot be demodulated in the imaging device main body 110.

In the same manner, imaging control signals (e.g. SC1, SC2, and SC3) outputted from the ISP 112 to the imaging controller 103 in arbitrary timing and ACK signals (SA1 SA2, and SA3) outputted from the imaging controller 103 to the ISP 112 in response to the imaging control signals (SC1, SC2, and SC3) are pulse-modulated and superimposed on the DC power voltage applied to the coaxial cable for output. As shown in FIG. 6, when part of the imaging control signal (SC1 or SC2) and the ACK signal (SA1 or SA2) are outputted in the voltage variation period immediately after the time t0 or t1 of the turn-on or -off control of the LED 106, the signals cannot be demodulated, thus causing a communication error.

From the above reasons, irrespective of a conventional demand for inexpensive and simple connection between the camera module and the imaging device main body of the video imaging device using the one coaxial cable, a video imaging device having such structure cannot be in practical use.

Considering the conventional problems described above, the present invention aims at providing a video imaging device in which, even if a camera module and an imaging device main body are connected only by one coaxial cable, a communication error does not occur between the camera module and the imaging device main body through the coaxial cable.

Solution to Problem

To achieve the above object, a video imaging device according to a first aspect of the present invention includes: a camera module having an imaging unit configured to capture an image of an imaging field in a predetermined exposure operation period and, after the end of the exposure operation period, sequentially output an imaging signal representing each captured frame image together with imaging operation timing information thereof, a light source configured to illuminate the imaging field, and a light source controller configured to control the turn-on and -off of the light source in accordance with a light source control signal generated on the basis of the imaging operation timing information; an imaging device main body having an image signal processor configured to generate a video image from the imaging signals sequentially outputted from the imaging unit and the imaging operation timing information by sequentially joining the frame images and outputs the video image, and a DC power circuit configured to supply DC power to the camera module; and a coaxial cable configured to connect between the camera module and the imaging device main body. A DC power voltage is applied from the DC power circuit to the coaxial cable to drive each component of the camera module. The imaging signals and the imaging operation timing information thereof sequentially outputted from the imaging unit are outputted to the image signal processor in a state of being superimposed on the DC power voltage applied to the coaxial cable by a first superimposition circuit of the camera module. The first superimposition circuit superimposes the imaging signals sequentially outputted from the imaging unit and the imaging operation timing information thereof on the DC power voltage applied to the coaxial cable in a voltage stable period after a lapse of a voltage variation period that is set at a predetermined elapsed time from a time of the turn-on or -off control of the light source.

Since the DC power voltage applied to the coaxial cable varies in a certain period from the turn-on and -off control of the light source, and the voltage variation period from the time of the turn-on and -off control can be forecasted from the consumption current of the light source, the output power of the DC power circuit, and the like, the voltage variation period is set at the predetermined elapsed time from the time of the turn-on or -off control of the light source. The first superimposition circuit of the camera module superimposes the imaging signals sequentially outputted from the imaging unit and the imaging operation timing information thereof on the DC power voltage applied to the coaxial cable in the voltage stable period after a lapse of the set voltage variation period, so that the imaging signals and the imaging operation timing information thereof can be outputted to the imaging device main body without being affected by variations in the DC power voltage.

In the video imaging device according to a second aspect of the present invention, the imaging unit delays the output timing of the imaging signals and the imaging operation timing information thereof after the end of the exposure operation period such that the imaging signals and the imaging operation timing information thereof are outputted in the voltage stable period after a lapse of the voltage variation period that is set at the predetermined elapsed time from the time of the turn-off control of the light source until the time of the turn-on control of the light source.

Since the light source control signal for the turn-on or -off control of the light source is generated on the basis of the imaging operation timing information outputted from the imaging unit, the imaging unit can output the imaging signals and the imaging operation timing information thereof outputted after the turn-off control of the light source with delay in the voltage stable period, which is set after a lapse of the voltage variation period that is set at the predetermined elapsed time from the time of the turn-off control of the light source until the next turn-on control of the light source.

In the video imaging device according to a third aspect of the present invention, the imaging unit relatively delays the time of end of the exposure operation period with respect to the time of the turn-off control of the light source, such that the imaging signals and the imaging operation timing information thereof are outputted in the voltage stable period, which is set after a lapse of the voltage variation period that is set at the predetermined elapsed time from the time of the turn-off control of the light source until the time of the turn-on control of the light source.

Since the imaging unit delays the time of end of the exposure operation period, or the light source controller advances the time of the turn-off control of the light source, or both the imaging unit and the light source controller perform as such, the time of end of the exposure operation period can be relatively later than the time of the turn-off control of the light source, so that it is possible to advance the output of the imaging signals and the imaging operation timing information thereof, which should be outputted in the voltage stable period after a lapse of the voltage variation period.

In the video imaging device according to a fourth aspect of the present invention, the camera module further has an imaging controller configured to control the imaging operation of the imaging unit in accordance with an imaging control signal. The image signal processor generates the imaging control signal from the imaging signal representing each frame image, and a second superimposition circuit of the imaging device main body superimposes the imaging control signal generated by the image signal processor on the DC power voltage applied to the coaxial cable, and outputs the imaging control signal to the imaging controller.

The imaging control signal generated by the imaging signal representing each frame image is outputted to the imaging controller through the coaxial cable, and the imaging controller controls the imaging operation of the imaging unit in accordance with the imaging control signal.

In the video imaging device according to a fifth aspect of the present invention, the first superimposition circuit superimposes the timing information of the voltage stable period outputted from the imaging unit on the DC power voltage applied to the coaxial cable, and outputs the timing information to the image signal processor. The second superimposition circuit superimposes the imaging control signal on the DC power voltage applied to the coaxial cable and outputs the imaging control signal to the imaging controller in the voltage stable period.

Since the timing information of the voltage stable period is inputted from the first superimposition circuit of the camera module, the image signal processor can output the imaging control signal, which has been generated by the image signal processor, from the second superimposition circuit to the imaging controller in a state of being superimposed on the DC power voltage applied to the coaxial cable.

In the video imaging device according to a sixth aspect of the present invention aspect of the present invention, the first superimposition circuit superimposes the timing information of the voltage stable period outputted from the imaging unit on the DC power voltage applied to the coaxial cable, and outputs the timing information to the image signal processor. When an ACK signal that has been outputted from the imaging controller in response to the imaging control signal has been inputted in a period other than the voltage stable period, the image signal processor ignores the ACK signal.

When the ACK signal is inputted in a period other than the voltage stable period, the imaging control signal in response to which the imaging controller has outputted the ACK signal or the ACK signal itself is outputted in a state of being superimposed on the DC power voltage of the coaxial cable in the voltage variation period, so that there is a possibility of the occurrence of a communication error. Thus, the image signal processor ignores the ACK signal, and imaging controller shall not recognize the imaging control signal.

In the video imaging device according to a seventh aspect of the present invention, when the imaging control signal outputted from the image signal processor is inputted in the voltage variation period, the imaging controller ignores the imaging control signal and does not output the ACK signal.

When the imaging control signal is inputted in the voltage variation period, the imaging control signal may be deformed due to variations in the DC power voltage on which the imaging control signal is superimposed. Therefore, the imaging controller does not control the operation of the imaging unit in accordance with the imaging control signal, and informs the image signal processor, by means of not outputting the ACK signal, that the imaging control signal has been ignored.

Advantageous Effects of Invention

According to the first aspect of the present invention, the camera module having the light source configured to illuminate the imaging field and the imaging device main body can be connected only by the one coaxial cable, and the imaging signals captured by the camera module can be reliably transmitted to the imaging device main body through the coaxial cable.

According to the second aspect of the present invention, the imaging signals and the imaging operation timing information thereof can be superimposed on the DC power voltage of the coaxial cable in the voltage stable period that is set after a lapse of the voltage variation period that is set at the predetermined elapsed time from the time of the turn-off control of the light source until the next turn-on control of the light source. Therefore, it is possible to transmit the imaging signals captured by the camera module to the imaging device main body through the coaxial cable without the occurrence of a communication error.

According to the third aspect of the present invention, since the exposure operation period of the imaging unit is ended in the voltage variation period after the time of the turn-off control of the light source, the voltage variation period quickly elapses after the end of the exposure operation period, and thereafter the imaging signals and the imaging operation timing information thereof can be outputted in the voltage stable period.

According to the fourth aspect of the present invention, since the image signal processor generates the imaging control signal for correcting the frame image from the inputted frame image and outputs the imaging control signal to the imaging controller through the coaxial cable, the correction of the frame image can be fed back to a frame image newly captured by the imaging unit.

According to the fifth aspect of the present invention, the imaging control signal generated by the image signal processor can be reliably transmitted to the imaging controller in the voltage stable period in a state of being superimposed on the DC power voltage applied to the coaxial cable.

According to the sixth aspect of the present invention, since the imaging control signal outputted in a period other than the voltage stable period has a possibility of being deformed into another signal due to a communication error, the imaging control signal shall not be outputted to the imaging controller. The imaging control signal may be transmitted again or a new imaging control signal may be outputted.

According to the seventh aspect of the present invention, the operation of the imaging unit is not improperly controlled in accordance with the imaging control signal that may have been deformed due to the communication error, and the image signal processor can be informed that the imaging operation has not been controlled in accordance with the imaging control signal.

DESCRIPTION OF EMBODIMENTS

Figure 1:
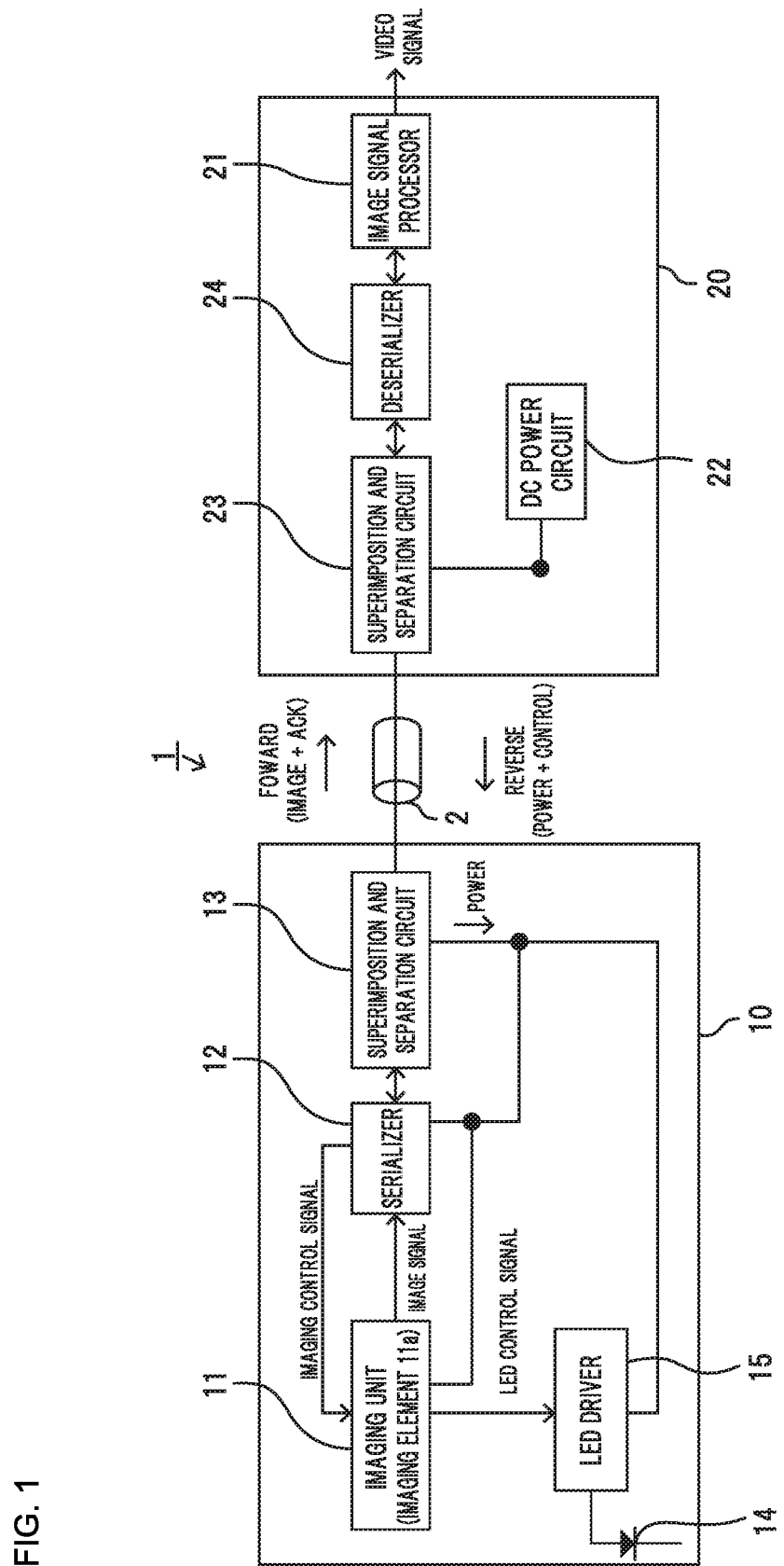
FIG. 1 is a block diagram of a video imaging device 1 according to an embodiment of the present invention.

A video imaging device 1 according to an embodiment of the present invention will be described below with reference to FIGS. 1 and 2. In the video imaging device 1, a camera module 10, which has an imaging unit 11 configured to capture an image of an imaging field and a light source 14 configured to illuminate the imaging field, and an imaging device main body 20, which has an image signal processor 21 configured to generate a video image from imaging signals sequentially inputted from the camera module 10 and output the video image, are connected by one coaxial cable 2. A DC power voltage of 5 V is applied from a DC power circuit 22 of the imaging device main body 20 to a core wire of the coaxial cable 2, to supply DC power to each component of the camera module 10, including the light source 14. Through the coaxial cable 2, bidirectional communication, i.e. forward communication for transmitting imaging signals, imaging operation timing information, and the like, as described later, from the camera module 10 to the imaging device main body 20 and reverse communication for transmitting imaging control signals, as described later, from the imaging device main body 20 to the camera module 10 are performed.

The video imaging device 1 according to the present embodiment is used in a drowsy driver monitoring system that issues a warning to a drowsy driver on the basis of the facial expressions of the driver who is driving a vehicle. The camera module 10 includes the imaging unit 11 for an infrared camera that can sensitively image the facial expressions of the driver illuminated with infrared light even at night, a serializer 12 that functions as both an imaging controller and a modulation and demodulation unit, a superimposition and separation circuit 13 to which an end of the coaxial cable 2 is connected, an infrared LED 14 that functions as a light source for emitting the infrared light, which does not interfere with the driving of the driver, at night, and an LED driver 15 configured to control the turn-on and -off of the infrared LED 14.

The imaging unit 11 is constituted of components, including a lens having a focusing unit and an aperture stop, an electronic shutter, an imaging element 11$a$, a signal processing circuit, an A/D converter circuit, and an RGB gain correction circuit. The imaging operation, including AF control, AE control, AWB control, and the like, of each of the components is controlled by imaging control signals outputted from the image signal processor 21 of the imaging device main body 20 through an imaging controller of the serializer 12.

The imaging element 11$a$ of the imaging unit 11 is constituted of a CMOS sensor having a matrix of an enormous number of pixels, in which a plurality of pixel lines having pixel groups arranged in a row direction are arranged in a column direction. In each pixel, signal charge is accumulated in a photodiode, and outputted as a pixel signal composed of a voltage signal. The imaging operation of the imaging element 11$a$ is controlled by an exposure control signal and a timing control signal of a reading control signal, included in the imaging control signals outputted from the serializer 12. The imaging element 11$a$ captures a frame image of the whole imaging field in 1/30 seconds, which is an imaging period of one frame image, in other words, in one frame period TF of approximately 33 msec. Thereafter, the imaging element 11$a$ reads all the pixel signals representing the one frame image, and then outputs the pixel signals to the subsequent serializer 12 as analog imaging signals.

Figure 2:
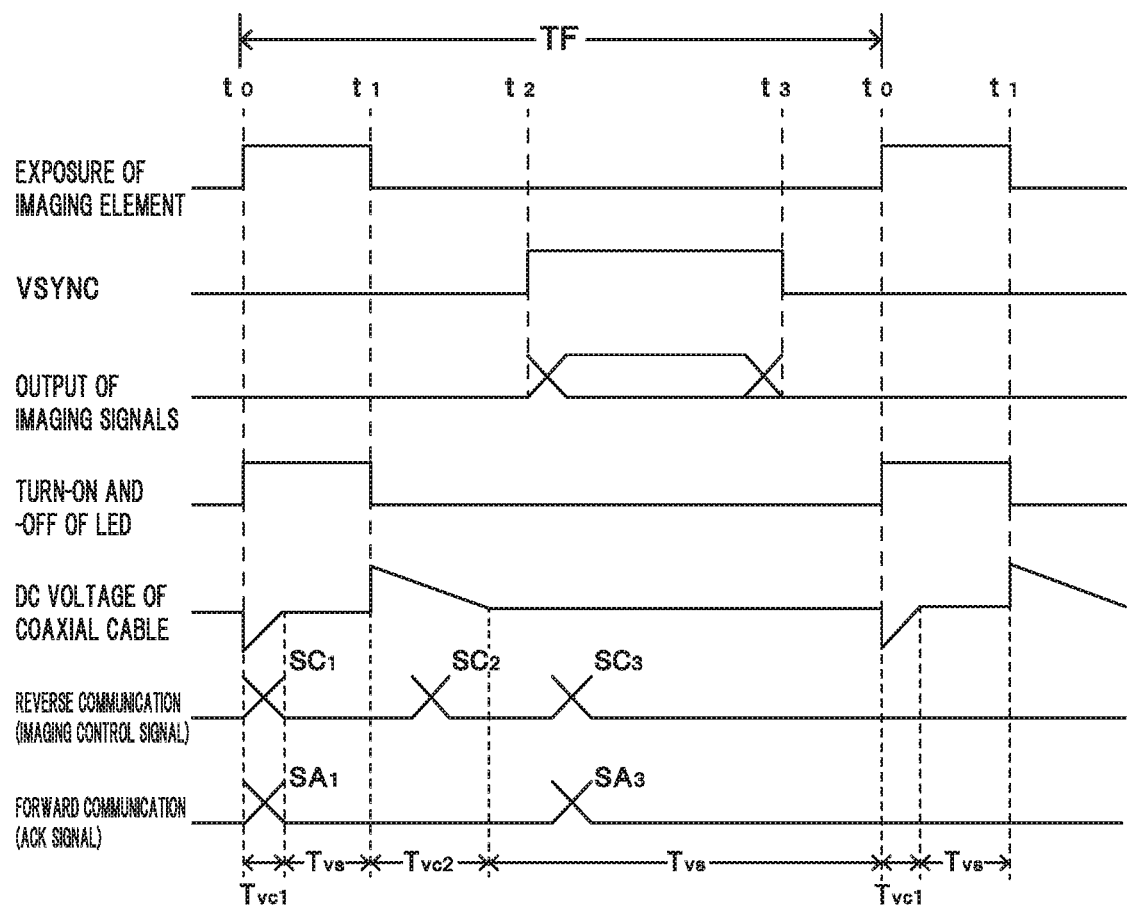
FIG. 2 is a timing chart showing the operation timing of each component of the video imaging device 1.

In other words, as shown in FIG. 2, the imaging element 11$a$ has the electronic function of a global shutter. Upon reception of the exposure control signal of global reset, the pixels of all the pixel lines are exposed in the same exposure operation period (a time between t0 and t1 in FIG. 2). Signal charge accumulated in the pixels of all the pixel lines are sequentially read out, as pixel signals, on a pixel line basis in an output period (a time between t2 and t3 in FIG. 2), which synchronizes with a vertical synchronization signal VSYNC in a voltage stable period Tvs, as described later, after a lapse of a second voltage variation period Tvc2 from the time t1 of the end of the exposure operation period. The pixel signals are then outputted to the subsequent serializer 12 as an analog imaging signal representing one frame image.

The imaging unit 11 adds the imaging operation timing information including the time t0 of start of an exposure, the time t1 of end of the exposure, the time t2 of start of an output, and the time t3 of end of the output when the one frame image is captured, to the imaging signal, and outputs the imaging signal to the subsequent serializer 12. The imaging unit 11 outputs an LED control signal, which controls the turn-on of the infrared LED 14 in the exposure operation period (time between t0 and t1 in FIG. 2) based on the imaging operation timing information, to the LED driver 15, so the LED driver 15 controls the turn-on of the infrared LED 14 in the exposure operation period in accordance with the LED control signal to illuminate the imaging field with the infrared light.

The modulation and demodulation unit of the serializer 12 outputs modulated signals composed of pulse signals having a modulated amplitude of 200 mV, the pulse wavelengths of which are modulated with the imaging signal, the imaging operation timing information, and the ACK signal (these signals are hereinafter referred to as forward communication signals), as described later, inputted from the imaging unit 11, to the superimposition and separation circuit 13 connected to the end of the coaxial cable 2.

The serializer 12 demodulates a modulated signal inputted from the superimposition and separation circuit 13 by reverse communication into an imaging control signal outputted from the image signal processor of the imaging device main body 20, in order to control the operation of each component of the imaging unit 11 in accordance with the demodulated imaging control signal (for example, SC3 in FIG. 2). When demodulating the imaging control signal, the serializer 12 generates an ACK signal (for example, SA3 in FIG. 2) and adds the ACK signal to the forward communication signal.

However, when an imaging control signal (for example, SC2 in FIG. 2) is demodulated by the serializer 12 from a modulated signal that is inputted from the superimposition and separation circuit 13 in a voltage variation period Tvc1 or Tvc2, as described later, determined from the imaging operation timing information inputted from the imaging unit 11, the demodulated imaging control signal (SC2 in FIG. 2) may partly contain an error. Therefore, the imaging control signal is ignored, and, as shown in the chart, an ACK signal may not be outputted.

The superimposition and separation circuit 13, which is a first superimposition circuit, superimposes the modulated signal inputted from the serializer 12 on the DC power voltage of 5 V applied to the coaxial cable 2, and outputs the modulated signal by forward communication. The superimposition and separation circuit 13 superimposes the modulated signal outputted from the imaging device main body 20 on the DC power voltage of 5 V of the coaxial cable 2, and outputs the modulated signal to the serializer 12.

The superimposition and separation circuit 13 separates the DC power of 5 V from the coaxial cable 2, and supplies the DC power to the individual components of the camera module 10 to drive the components. Since the infrared LED 14 of the camera module 10 is turned on with DC power of 5 V and 1 A, as shown in FIG. 2, the voltage of the core wire of the coaxial cable 2 instantaneously drops from 5 V at the time t0 of the turn-on control of the infrared LED 14, and gradually increases in a first voltage variation period Tvc1. After a lapse of the first voltage variation period Tvc1, the voltage of the core wire of the coaxial cable 2 becomes stable at 5 V.

At the time t1 of the turn-off control of the infrared LED 14, the voltage of the core wire of the coaxial cable 2 instantaneously rises from 5 V, and gradually decreases in the second voltage variation period Tvc2. After a lapse of the second voltage variation period Tvc2, the voltage of the core wire of the coaxial cable 2 returns to and stabilizes at 5 V. The first voltage variation period Tvc1, which is a time required for stabilizing the voltage after the time t0 of the turn-on control, and the second voltage variation period Tvc2, which is a time required for stabilizing the voltage after the time t1 of the turn-off control, each vary depending on the output power of the DC power circuit 22, a power consumption during the turn-on of the infrared LED 14, and other circuit constants, and therefore are set in advance on the basis of measurement values. Accordingly, as shown in FIG. 2, the voltage stable period Tvs in which the DC power voltage of the coaxial cable 2 becomes stable is the time of the one frame period TF excluding the first voltage variation period Tvc1 and the second voltage variation period Tvc2. Therefore, the superimposition and separation circuit 13 superimposes the imaging signal and the imaging operation timing information on the DC power voltage of the coaxial cable 2 in the voltage stable period Tvs.

A superimposition and separation circuit 23, which is a second superimposition circuit connected to the other end of the coaxial cable 2 on the side of the imaging device main body 20, applies the DC power of 5 V outputted from the DC power circuit 22 to the coaxial cable 2. The superimposition and separation circuit 23 outputs a modulated signal inputted from a deserializer 24 in a state that the modulated signal is superimposed on the DC power voltage of 5 V applied to the coaxial cable 2 (reverse communication). The superimposition and separation circuit 23 separates a modulated signal that is outputted from the camera module 10 in a state of being superimposed on the DC power voltage of 5 V of the coaxial cable 2 and is composed of a pulse signal having an amplitude of 200 mV, and outputs the modulated signal to the deserializer 24.

The deserializer 24 outputs the modulated signal composed of a pulse signal having a modulated amplitude of 200 mV, the pulse wavelength of which is modulated with the imaging control signal inputted from the image signal processor 21, to the superimposition and separation circuit 23. The deserializer 24 demodulates a forward communication signal from the modulated signal inputted from the superimposition and separation circuit 23 by forward communication, and outputs the forward communication signal to the image signal processor 21.

The image signal processor 21 of the imaging device main body 20 generates a video image by sequentially joining the imaging signals each representing one frame image, inputted from the deserializer 24, and outputs a video signal of the video image to the drowsy driver monitoring system, which issues a warning to a drowsy driver on the basis of the facial expressions of the driver who is driving a vehicle.

The image signal processor 21 generates the imaging control signal from each inputted frame image at arbitrary timing to correct the frame image, and outputs the imaging control signal to the serializer 12, which functions as the imaging controller of the camera module 10, by reverse communication in a state of being superimposed on the DC power voltage of the coaxial cable 2. The serializer 12 controls the imaging operation of the imaging unit 11 in accordance with the imaging control signal, so that the correction of the frame image is fed back to a frame image that is newly imaged by the imaging unit 11.

In the present embodiment, the time t0 of the turn-on control of the infrared LED 14 and the time t1 of the turn-off control of the infrared LED 14 coincide with the time t0 of start of the exposure and the time t1 of end of the exposure, respectively, and the first voltage variation period Tvc1 and the second voltage variation period Tvc2 are times known by the image signal processor 21, which has set the periods Tvc1 and Tvc2 in advance. Therefore, the image signal processor 21 can obtain the voltage stable period Tvs of the one frame period TF from the first voltage variation period Tvc1 and the second voltage variation period Tvc2, which are known in advance, using the time t0 of start of the exposure and the time t1 of end of the exposure included in the imaging operation timing information outputted from the camera module 10, as timing information of the voltage stable period.

Therefore, when the ASK signal, which is outputted from the serializer 12 of the camera module 10 in response to the imaging control signal generated at arbitrary timing, is inputted from the deserializer 24 in a period other than the voltage stable period Tvs determined from the timing information of the voltage stable period, the image signal processor 21 assumes that the ASK signal (SA1 in FIG. 2) is an imaging control signal (SC1 in FIG. 2) outputted in a state of being superimposed on the DC power voltage of the coaxial cable 2 in the voltage variation period Tvc1 or Tvc2, and is outputted in response to the imaging control signal (SC1 in FIG. 2) containing a communication error. Therefore, the image signal processor 21 ignores the ACK signal, and sends the same imaging control signal again.

According to the video imaging device 1, even if the camera module 10 and the imaging device main body 20 are connected only by the one coaxial cable 2, the modulated signal, which has been modulated with the imaging signal and the imaging operation timing information, is superimposed on the DC power voltage of the coaxial cable 2 in the voltage stable period Tvs in which the DC power voltage of the coaxial cable 2 stabilizes at 5 V. Therefore, the pulse waveform of the modulated signal does not collapse, or the rising edge or falling edge of the modulated signal does not vary in accordance with variations in the DC power voltage, and therefore the deserializer 24 of the imaging device main body 20 can correctly modulate the imaging signal and the imaging operation timing information, and output the imaging signal and the imaging operation timing information to the image signal processor 21.

The imaging control signal for controlling the imaging operation of the imaging unit 11 of the camera module 10 can be outputted from the image signal processor 21 of the imaging device main body 20 by using the power cable 2 for supplying the DC power to each component of the camera module 10. Furthermore, when the imaging control signal is outputted in the voltage variation period Tvc1 or Tvc2, the camera module 10 can ignore the imaging control signal, or it is recognized that the image signal processor 21 of the imaging device main body 20 has outputted the imaging control signal having the possibility of a communication error.

Figure 3:
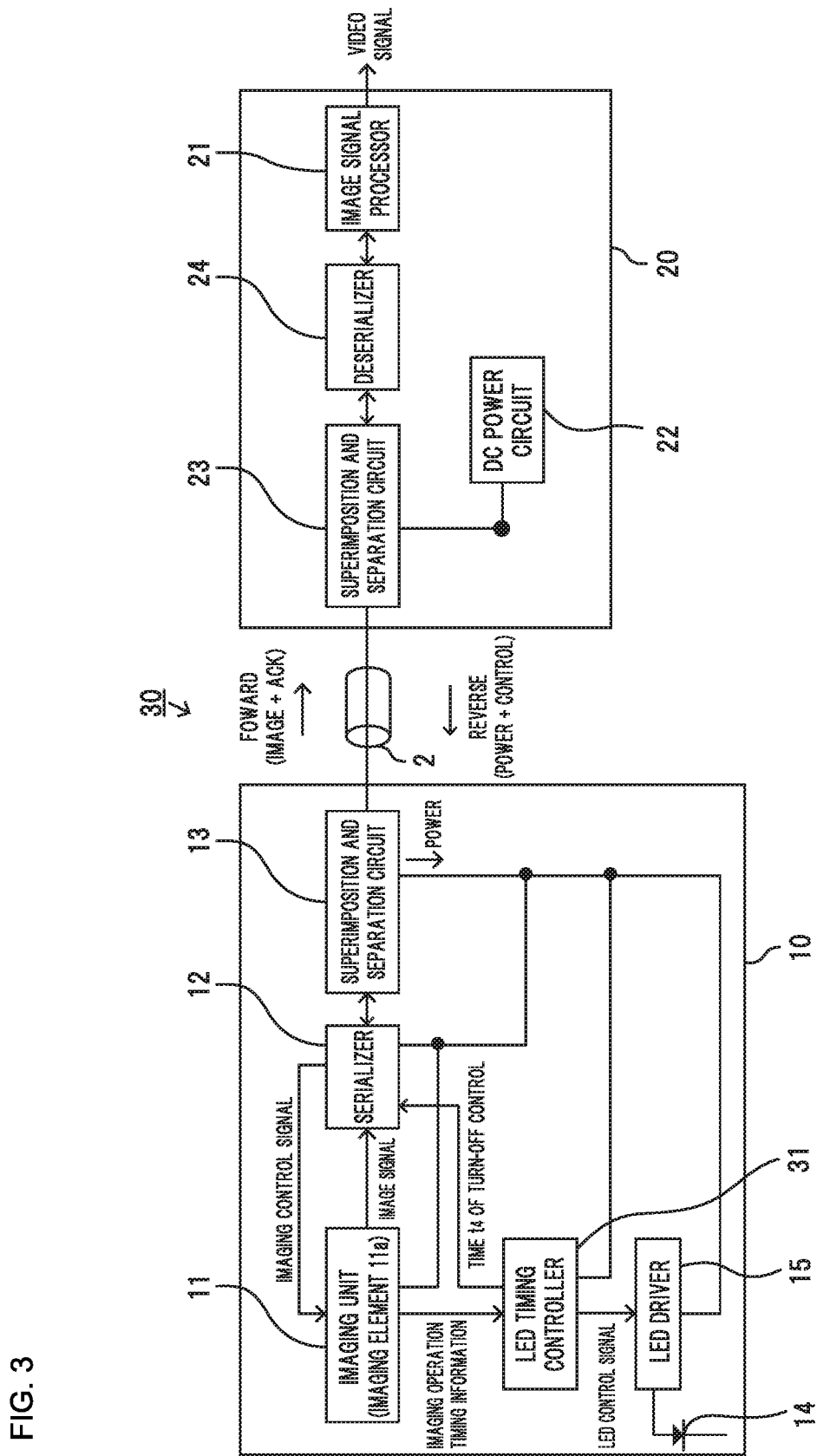
FIG. 3 is a block diagram of a video imaging device 30 according to a second embodiment.

Next, a video imaging device 30 according to a second embodiment of the present invention will be described with reference to FIGS. 3 and 4. In the description of the second embodiment, components that function the same as or similar to those of the first embodiment are assigned the same reference numerals, and a detailed description thereof is omitted.

Figure 4:
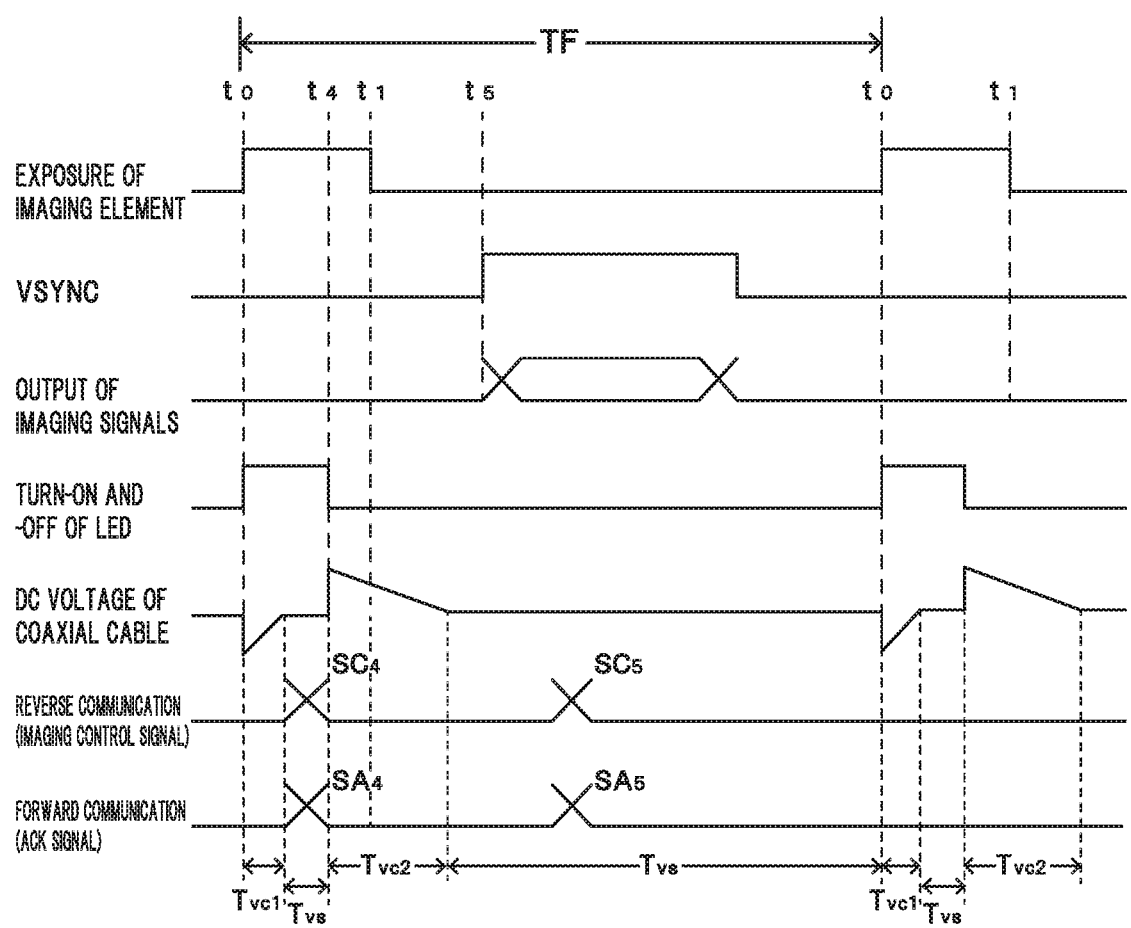
FIG. 4 is a timing chart showing the operation timing of each component of the video imaging device 30.
Figure 5:
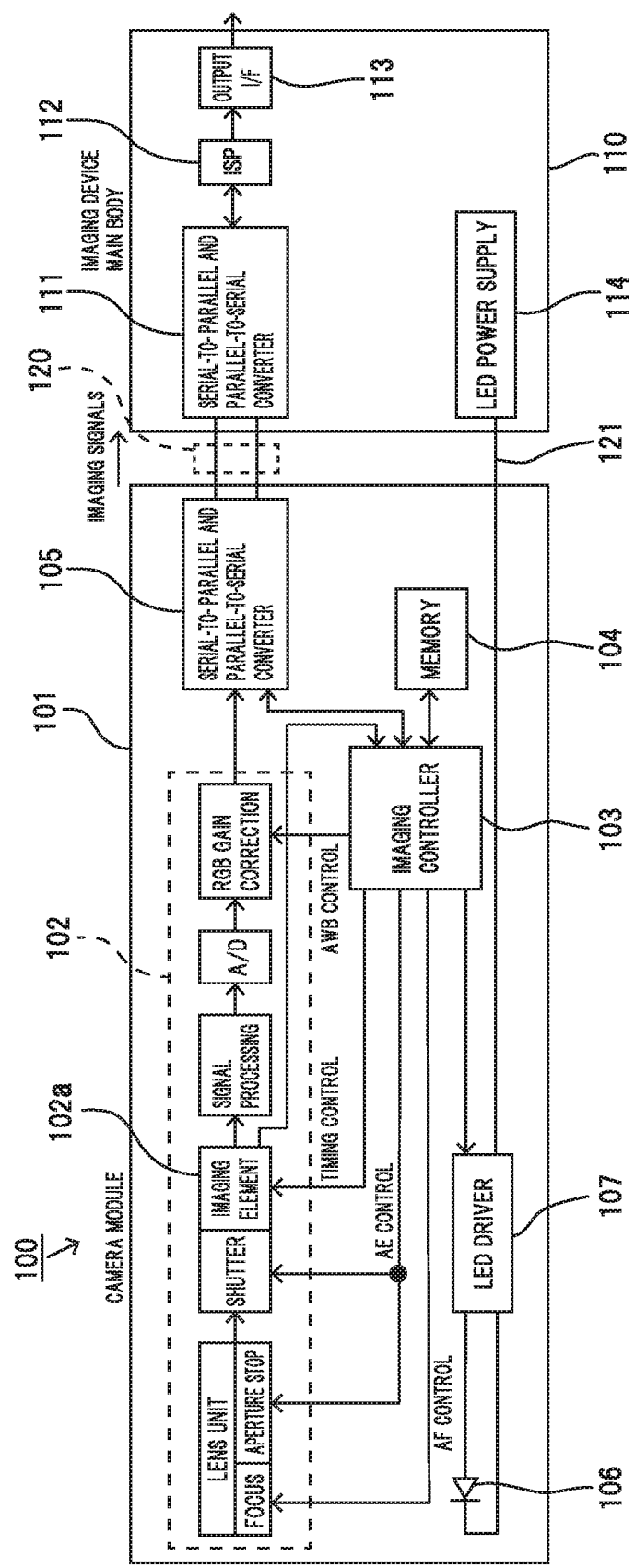
FIG. 5 is a block diagram of a conventional video imaging device 100.
Figure 6:
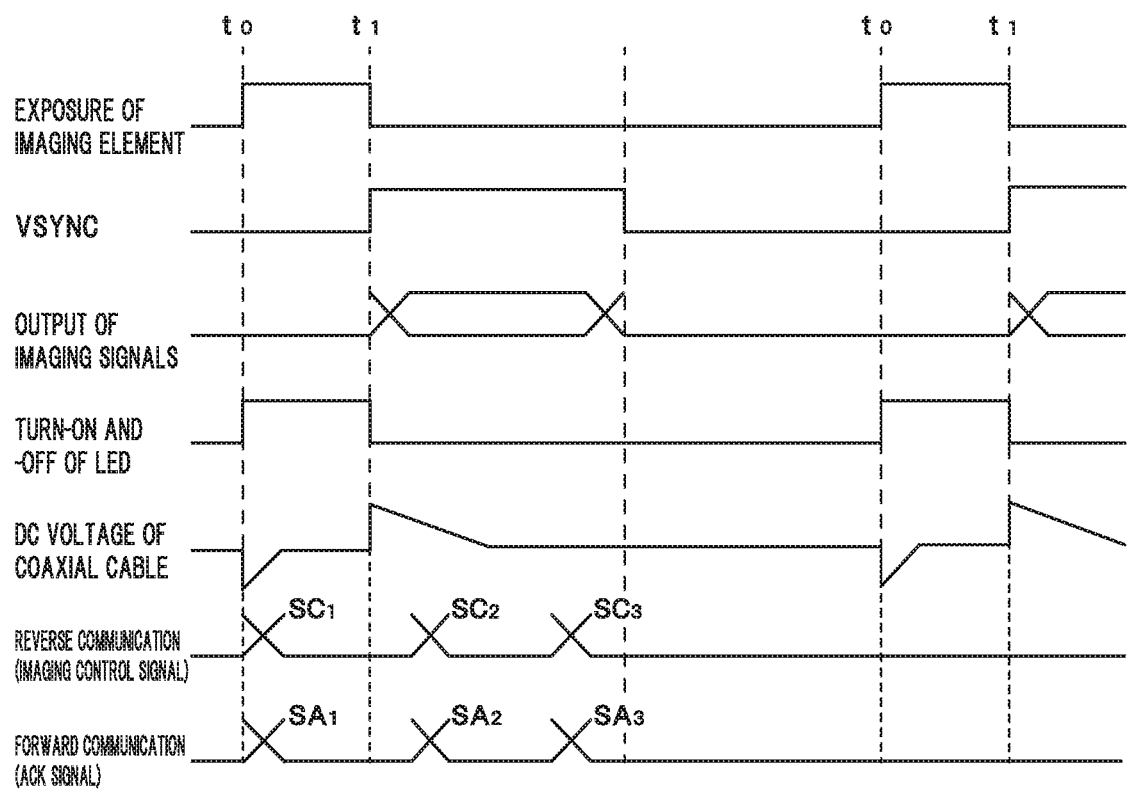
FIG. 6 is a timing chart showing the operation timing of each component of the video imaging device 100 using a coaxial cable.

In the video imaging device 30 shown in FIG. 4 as compared with the video imaging device 1 according to the first embodiment, the infrared LED 14 is turned off at the time t4 before the time t1 of end of the exposure operation period (time between t0 and t1 in FIG. 4) in order to advance the time t5 of start of an output of the imaging signals after the end of the second voltage variation period Tvc2. All the imaging signals and the imaging operation timing information representing the one frame image are thereby reliably superimposed on the DC power voltage of the coaxial cable 2 and outputted to the imaging device main body 20 in the voltage stable period Tvs of the one frame period TF.

Since the infrared LED 14 is turned off at the time t4 before the time t1 of end of the exposure operation period, an LED timing controller 31 is connected between the imaging unit 11 and the LED driver 15 of the camera module 10. The LED timing controller 31 generates an LED control signal in which the time t4 of the turn-off control of the infrared LED 14 becomes earlier than the time t1 of the end of exposure in the exposure operation period between t0 and t1, from the imaging operation timing information outputted from the imaging unit 11, including the time t0 of start of the exposure and the time t1 of end of the exposure, when the one frame image is captured, and outputs the LED control signal to the LED driver 15.

The LED timing controller 31 outputs the time t4 of the turn-off control contained in the LED control signal to the serializer 12, and the serializer 12 adds the time t4 of the turn-off control to the imaging operation timing information inputted from the imaging unit 11, as the timing information in the voltage stable period.

Since the LED driver 15 controls the turn-on and -off of the infrared LED 14 in accordance with the LED control signal, the infrared LED 14 is turned off at the time t4 before the time t1 of end of the exposure operation of the imaging element 11a. However, since the infrared LED 14 is turned on in the period between t0 and t4 in the exposure period, the imaging element 11a can capture an image of the imaging field illuminated with the infrared LED 14.

According to the video imaging device 30, since the second voltage variation period Tvc2 is started from the time t4 of the turn-off control before the time t1 of end of the exposure operation period, a shift from the second voltage variation period Tvc2 to the voltage stable period Tvs is advanced. Therefore, the imaging element 11a of the imaging unit 11 can advance the time t5 of start of an output of the analog imaging signal representing the one frame image to be outputted to the serializer 12 after the time t1 of end of the exposure operation period.

In the present embodiment, the image signal processor 21 of the imaging device main body 20 can obtain the voltage stable period Tvs of each frame period TF from the time t0 of the turn-on control (exposure start time), the time t4 of the turn-off control, and the first voltage variation period Tvc1 and the second voltage variation period Tvc2 known in advance, which are timing information of the voltage stable period included in the imaging operation timing information inputted from the deserializer 24. Therefore, as shown in FIG. 4, the image signal processor 21 of the imaging device main body 20 can output the imaging control signals (SC4 and SC5 in FIG. 4) for correcting the frame image in the voltage stable period Tvs, and output the ACK signal (SA4 and SA5 in FIG. 4) in response to the serializer 12 in the voltage stable period Tvs. Accordingly, even if the imaging control signals are superimposed on the DC power voltage of the coaxial cable 2, the imaging operation of the imaging unit 11 can be controlled without the occurrence of a communication error.

In the present embodiment, the turn-on and -off of the infrared LED 14 are controlled such that the time t4 of the turn-off control of the infrared LED 14 becomes earlier than the time t1 of end of the exposure using the LED control signal generated by the LED timing controller 31, but the serializer 12 of the imaging controller may control the operation of the imaging element 11a such that the time t1 of end of the exposure becomes later than the time t4 of the turn-off control of the infrared LED 14, or both the control ways may be used in combination.

The time t5 of start of the output period for outputting the imaging signals is set later than the time t1 of end of the exposure operation period. However, the output of the imaging signals may be started at the time t1 of end of the exposure operation period, as long as the second voltage variation period Tvc2 has elapsed at the time t1 of end of the exposure operation period.

The image signal processor 21 outputs the imaging control signal in timing that the imaging control signal is superimposed on the DC power voltage of the coaxial cable 2 in the voltage stable period Tvs. However, the deserializer 24 or the superimposition and separation circuit 23 may be provided with a buffer, and the imaging control signal may be superimposed on the DC power voltage of the coaxial cable 2 in the voltage stable period Tvs.

On the other hand, in each of the above-described embodiments, the serializer 12 of the camera module 10 outputs the forward communication signal in timing that the forward communication signal is superimposed on the DC power voltage of the coaxial cable 2 in the voltage stable period Tvs. However, by using the superimposition and separation circuit 13 having a buffer, the forward communication signal may be superimposed on the DC power voltage of the coaxial cable 2 in the voltage stable period Tvs.

In the video imaging device 1 or 30, both of the camera module 10 and the imaging device main body 20 are not necessarily installed in a vehicle. The present invention can be applied to every video imaging device having a light source for illuminating an imaging field.

INDUSTRIAL APPLICABILITY

The present invention is suitable for a video imaging device configured to capture an image of an imaging field illuminated by a light source, and more specifically a video imaging device in which an imaging device main body and a camera module are connected by a power cable for supplying power to a light source of the camera module.

REFERENCE SIGNS LIST 1, 30 video imaging device
2 coaxial cable
10 camera module
11 imaging unit
11a imaging element
12 serializer (modulation and demodulation unit, imaging controller)
13 superimposition and separation circuit (first superimposition circuit)
14 infrared LED (light source)
15 LED driver (light source controller)
20 imaging device main body
21 image signal processor
22 DC power circuit
23 superimposition and separation circuit (second superimposition circuit)
24 deserializer (modulation and demodulation unit)
31 LED timing controller
Tvc1 first voltage variation period
Tvc2 second voltage variation period
Tvs voltage stable period

The invention claimed is:

1. A video imaging device comprising:
a camera module having an imaging unit configured to capture an image of an imaging field in a predetermined exposure operation period and, after an end of the exposure operation period, sequentially output an imaging signal representing each captured frame image together with imaging operation timing information thereof, a light source configured to illuminate the imaging field, and a light source controller configured to control turn-on and -off of the light source in accordance with a light source control signal generated on a basis of the imaging operation timing information;
an imaging device main body having an image signal processor configured to generate a video image from the imaging signals sequentially outputted from the imaging unit and the imaging operation timing information by sequentially joining the frame images and outputs the video image, and a DC power circuit configured to supply DC power to the camera module; and
a coaxial cable configured to connect between the camera module and the imaging device main body,
wherein a DC power voltage is applied from the DC power circuit to the coaxial cable to drive each component of the camera module, and the imaging signals and the imaging operation timing information thereof sequentially outputted from the imaging unit are outputted to the image signal processor in a state of being superimposed on the DC power voltage applied to the coaxial cable by a first superimposition circuit of the camera module, and
the first superimposition circuit superimposes the imaging signals sequentially outputted from the imaging unit and the imaging operation timing information thereof on the DC power voltage applied to the coaxial cable in a voltage stable period after a lapse of a voltage variation period that is set at a predetermined elapsed time from a time of the turn-on or -off control of the light source, and
wherein the imaging unit delays an output timing of the imaging signals and the imaging operation timing information thereof after the end of the exposure operation period such that the imaging signals and the imaging operation timing information thereof are outputted in the voltage stable period after a lapse of the voltage variation period that is set at the predetermined elapsed time from the time of the turn-off control of the light source until the time of the turn-on control of the light source.

2. The video imaging device according to claim 1, wherein the imaging unit relatively delays the time of end of the exposure operation period with respect to the time of the turn-off control of the light source, such that the imaging signals and the imaging operation timing information thereof are outputted in the voltage stable period, which is set after a lapse of the voltage variation period that is set at the predetermined elapsed time from the time of the turn-off control of the light source until the time of the turn-on control of the light source.

3. The video imaging device according to claim 2, wherein the camera module further has an imaging controller configured to control the imaging operation of the imaging unit in accordance with an imaging control signal, the image signal processor generates the imaging control signal from the imaging signal representing each frame image, and a second superimposition circuit of the imaging device main body superimposes the imaging control signal generated by the image signal processor on the DC power voltage applied to the coaxial cable, and outputs the imaging control signal to the imaging controller.

4. The video imaging device according to claim 3, wherein the first superimposition circuit superimposes the timing information of the voltage stable period outputted from the imaging unit on the DC power voltage applied to the coaxial cable, and outputs the timing information to the image signal processor, and the second superimposition circuit superimposes the imaging control signal on the DC power voltage applied to the coaxial cable and outputs the imaging control signal to the imaging controller in the voltage stable period.

5. The video imaging device according to claim 3, wherein the first superimposition circuit superimposes the timing information of the voltage stable period outputted from the imaging unit on the DC power voltage applied to the coaxial cable, and outputs the timing information to the image signal processor, and when an ACK signal that has been outputted from the imaging controller in response to the imaging control signal has been inputted in a period other than the voltage stable period, the image signal processor ignores the ACK signal.

6. The video imaging device according to claim 3, wherein when the imaging control signal outputted from the image signal processor is inputted in the voltage variation period, the imaging controller ignores the imaging control signal and does not output the ACK signal.

7. The video imaging device according to claim 1, wherein the camera module further has an imaging controller configured to control the imaging operation of the imaging unit in accordance with an imaging control signal, the image signal processor generates the imaging control signal from the imaging signal representing each frame image, and a second superimposition circuit of the imaging device main body superimposes the imaging control signal generated by the image signal processor on the DC power voltage applied to the coaxial cable, and outputs the imaging control signal to the imaging controller.

8. The video imaging device according to claim 7, wherein the first superimposition circuit superimposes the timing information of the voltage stable period outputted from the imaging unit on the DC power voltage applied to the coaxial cable, and outputs the timing information to the image signal processor, and the second superimposition circuit superimposes the imaging control signal on the DC power voltage applied to the coaxial cable and outputs the imaging control signal to the imaging controller in the voltage stable period.

9. The video imaging device according to claim 7, wherein the first superimposition circuit superimposes the timing information of the voltage stable period outputted from the imaging unit on the DC power voltage applied to the coaxial cable, and outputs the timing information to the image signal processor, and when an ACK signal that has been outputted from the imaging controller in response to the imaging control signal has been inputted in a period other than the voltage stable period, the image signal processor ignores the ACK signal.

10. The video imaging device according to claim 7, wherein when the imaging control signal outputted from the image signal processor is inputted in the voltage variation period, the imaging controller ignores the imaging control signal and does not output the ACK signal.

11. A video imaging device comprising:

a camera module having an imaging unit configured to capture an image of an imaging field in a predetermined exposure operation period and, after an end of the exposure operation period, sequentially output an imaging signal representing each captured frame image together with imaging operation timing information thereof, a light source configured to illuminate the imaging field, and a light source controller configured to control turn-on and -off of the light source in accordance with a light source control signal generated on a basis of the imaging operation timing information;

an imaging device main body having an image signal processor configured to generate a video image from the imaging signals sequentially outputted from the imaging unit and the imaging operation timing information by sequentially joining the frame images and outputs the video image, and a DC power circuit configured to supply DC power to the camera module; and a coaxial cable configured to connect between the camera module and the imaging device main body, wherein a DC power voltage is applied from the DC power circuit to the coaxial cable to drive each component of the camera module, and the imaging signals and the imaging operation timing information thereof sequentially outputted from the imaging unit are outputted to the image signal processor in a state of being superimposed on the DC power voltage applied to the coaxial cable by a first superimposition circuit of the camera module, and the first superimposition circuit superimposes the imaging signals sequentially outputted from the imaging unit and the imaging operation timing information thereof on the DC power voltage applied to the coaxial cable in a voltage stable period after a lapse of a voltage variation period that is set at a predetermined elapsed time from a time of the turn-on or -off control of the light source, and wherein the imaging unit relatively delays the time of end of the exposure operation period with respect to the time of the turn-off control of the light source, such that the imaging signals and the imaging operation timing information thereof are outputted in the voltage stable period, which is set after a lapse of the voltage variation period that is set at the predetermined elapsed time from the time of the turn-off control of the light source until the time of the turn-on control of the light source.

12. The video imaging device according to claim 11, wherein the camera module further has an imaging controller configured to control the imaging operation of the imaging unit in accordance with an imaging control signal, the image signal processor generates the imaging control signal from the imaging signal representing each frame image, and a second superimposition circuit of the imaging device main body superimposes the imaging control signal generated by the image signal processor on the DC power voltage applied to the coaxial cable, and outputs the imaging control signal to the imaging controller.

13. The video imaging device according to claim 12, wherein the first superimposition circuit superimposes the timing information of the voltage stable period outputted from the imaging unit on the DC power voltage applied to the coaxial cable, and outputs the timing information to the image signal processor, and the second superimposition circuit superimposes the imaging control signal on the DC power voltage applied to the coaxial cable and outputs the imaging control signal to the imaging controller in the voltage stable period.

14. The video imaging device according to claim 12, wherein the first superimposition circuit superimposes the timing information of the voltage stable period outputted from the imaging unit on the DC power voltage applied to the coaxial cable, and outputs the timing information to the image signal processor, and when an ACK signal that has been outputted from the imaging controller in response to the imaging control signal has been inputted in a period other than the voltage stable period, the image signal processor ignores the ACK signal.

15. The video imaging device according to claim 12, wherein when the imaging control signal outputted from the image signal processor is inputted in the voltage variation period, the imaging controller ignores the imaging control signal and does not output the ACK signal.

16. A video imaging device comprising:

a camera module having an imaging unit configured to capture an image of an imaging field in a predetermined exposure operation period and, after an end of the exposure operation period, sequentially output an imaging signal representing each captured frame image together with imaging operation timing information thereof, a light source configured to illuminate the imaging field, and a light source controller configured to control turn-on and -off of the light source in accordance with a light source control signal generated on a basis of the imaging operation timing information;

an imaging device main body having an image signal processor configured to generate a video image from the imaging signals sequentially outputted from the imaging unit and the imaging operation timing information by sequentially joining the frame images and outputs the video image, and a DC power circuit configured to supply DC power to the camera module; and a coaxial cable configured to connect between the camera module and the imaging device main body, wherein a DC power voltage is applied from the DC power circuit to the coaxial cable to drive each component of the camera module, and the imaging signals and the imaging operation timing information thereof sequentially outputted from the imaging unit are outputted to the image signal processor in a state of being superimposed on the DC power voltage applied to the coaxial cable by a first superimposition circuit of the camera module, and the first superimposition circuit superimposes the imaging signals sequentially outputted from the imaging unit and the imaging operation timing information thereof on the DC power voltage applied to the coaxial cable in a voltage stable period after a lapse of a voltage variation period that is set at a predetermined elapsed time from a time of the turn-on or -off control of the light source, wherein the camera module further has an imaging controller configured to control the imaging operation of the imaging unit in accordance with an imaging control signal, the image signal processor generates the imaging control signal from the imaging signal representing each frame image, and a second superimposition circuit of the imaging device main body superimposes the imaging control signal generated by the image signal processor on the DC power voltage applied to the coaxial cable, and outputs the imaging control signal to the imaging controller, and wherein the first superimposition circuit superimposes the timing information of the voltage stable period outputted from the imaging unit on the DC power voltage applied to the coaxial cable, and outputs the timing information to the image signal processor, and the second superimposition circuit superimposes the imaging control signal on the DC power voltage applied to the coaxial cable and outputs the imaging control signal to the imaging controller in the voltage stable period.

17. The video imaging device according to claim 16, wherein the first superimposition circuit superimposes the timing information of the voltage stable period outputted from the imaging unit on the DC power voltage applied to the coaxial cable, and outputs the timing information to the image signal processor, and when an ACK signal that has been outputted from the imaging controller in response to the imaging control signal has been inputted in a period other than the voltage stable period, the image signal processor ignores the ACK signal.

18. The video imaging device according to claim 16, wherein when the imaging control signal outputted from the image signal processor is inputted in the voltage variation period, the imaging controller ignores the imaging control signal and does not output the ACK signal.

* * * * *